United States Patent [19]

Edwards et al.

[11] Patent Number: 5,579,790
[45] Date of Patent: Dec. 3, 1996

[54] FILTER SCREEN WITH BACKFLUSH

[75] Inventors: James M. Edwards, Kinston; John E. Dries, Goldsboro, both of N.C.

[73] Assignee: White Consolidated Industries, Inc., Cleveland, Ohio

[21] Appl. No.: 420,697

[22] Filed: Apr. 12, 1995

[51] Int. Cl.⁶ .......................... A47L 15/42; B01D 29/10; B01D 29/66
[52] U.S. Cl. ...................... 134/104.1; 134/111; 210/167; 210/411; 210/422
[58] Field of Search ................................. 134/104.1, 111, 134/178, 186, 191, 195; 210/167, 411, 422

[56] References Cited

U.S. PATENT DOCUMENTS

| | | |
|---|---|---|
| 3,575,185 | 4/1971 | Barbulesco . |
| 3,807,419 | 4/1974 | Cushing et al. . |
| 3,989,054 | 11/1976 | Mercer . |
| 4,038,103 | 7/1977 | Grunewald . |
| 4,150,680 | 4/1979 | Johnson et al. . |
| 4,168,715 | 9/1979 | Spiegel et al. . |
| 4,319,598 | 3/1982 | Dingler et al. . |
| 4,319,599 | 3/1982 | Dingler et al. . |
| 4,347,861 | 9/1982 | Clearman et al. . |
| 4,392,891 | 7/1983 | Meyers . |
| 4,485,645 | 12/1984 | Mulder et al. . |
| 4,673,441 | 6/1987 | Mayers . |
| 4,730,630 | 3/1988 | Ranft . |
| 4,754,770 | 7/1988 | Fornasari . |
| 4,972,861 | 11/1990 | Milocco et al. . |
| 4,998,548 | 3/1991 | Lagerstrand . |
| 5,097,855 | 3/1992 | Martinsson et al. . |
| 5,165,433 | 11/1992 | Meyers . |

FOREIGN PATENT DOCUMENTS

| | | | |
|---|---|---|---|
| 2429948 | 2/1980 | France | 210/411 |
| 642748 | 9/1950 | United Kingdom | 210/411 |

*Primary Examiner*—Philip R. Coe
*Attorney, Agent, or Firm*—Pearne, Gordon, McCoy & Granger

[57] ABSTRACT

A filter screen assembly is provided which includes a housing, a filter screen, and two valve or check balls. The housing has two interior walls, each having openings therein which divide an interior space of the housing into top, center, and bottom chambers. A first inlet and a first outlet open into the top chamber and a second inlet and a second outlet open into the bottom chamber. The filter screen is horizontally disposed within the center chamber. One check ball is located in the top chamber and is biased to close the first inlet by a bottom inclined surface of the top chamber. The check ball is forced to substantially close the first outlet when fluid flows in the first inlet. The other check ball is located in the bottom chamber and is biased to close the second inlet by a bottom inclined surface of the bottom chamber. The check ball is forced to substantially close the second outlet when fluid flows in the second inlet. The filter screen thereby filters fluid entering the first inlet and exiting the second outlet and is automatically cleaned or backflushed by fluid entering the second inlet and exiting the first outlet.

20 Claims, 2 Drawing Sheets

U.S. Patent    Dec. 3, 1996    Sheet 1 of 2    5,579,790

FILTER SCREEN WITH BACKFLUSH

BACKGROUND OF THE INVENTION

1. Field of the Invention

The present invention generally relates to a filter screen assembly, and more specifically, a filter screen assembly for a dishwasher that filters soil from wash or rinse water and is automatically backflushed by drain water.

2. Description of Related Art

Domestic or household dishwashers generally consist of an enclosed cabinet having a bottom hinged door at the front of the cabinet for closing off an otherwise sealed washing chamber or tub. Dishes are placed on upper and lower racks which are arranged to slide or roll in and out of the tub when the door is open. The dishwashers typically have a rotating lower wash arm which rotates and carries a number of spray openings which direct water upward as the arm rotates to spray all of the dishes in the tub. Additionally, some dishwashers have an upper wash arm located above the lower rack and below the upper rack to provide additional washing ability. Furthermore, some dishwashers have an upper wash arm beneath the top wall of the tub to spray water down on all the dishes in the tub.

The dishwashers typically operate with alternating wash and rinse cycles in which the wash cycle is distinguished only by length of time and the fact that detergent has been added to the water. During each cycle, the water is drawn from a sump at the bottom of the tub and passes through a pump to the wash arms. The water passes over the dishes in the racks and returns to the sump. After each wash or rinse cycle is a drain cycle for removing the fluid within the sump so that it can receive fresh water.

A problem with all types of dishwashers is handling soil particles removed from the dishes being washed. As the soil particles are washed off the dishes, they pass into the water in the sump, are drawn into the pump with the water, and are recirculated through the wash arms. Therefore, the soil particles can be redeposited on the very dishes from which they were removed. Some soil particles are removed by a screen in the sump. Most of the soil particles pass through the screen, however, because the screen must be relatively coarse so that it does not become clogged.

In the case of dishwashers having separate drain and recirculation pumps, the solution to this problem has been to provide a collector or filter screen arranged such that the water passes through the filter screen in the recirculating cycles prior to entering the recirculation pump to remove the soil particles. The filter screen is automatically cleaned by water going to the drain from the drain pump during the drain cycle.

In the case of dishwashers having a single unidirectional pump, the solution to this problem has been to provide the pump with a macerator or cutting blade to break up the soil particles as they are recirculated until they become sufficiently fine to be less likely to be redeposited on the dishes. Alternatively, a filter screen is provided between the pump and the upper spray arm so that filtered water will wash or rinse any soil particles off the dishes even if such soil particles have been redeposited on the dishes by the lower spray arm. The filter screen is automatically cleaned by water going to the drain from the pump during the drain cycle.

SUMMARY OF THE INVENTION

The present invention provides an improved self-cleaning filter screen assembly. The filter screen assembly includes a housing, a filter screen, and first and second valve means. The housing has an interior, first and second inlets, and first and second outlets. The filter screen is located in the housing and divides the interior into first and second interior portions. The first inlet and the first outlet open into the first interior portion and the second inlet and the second outlet open into the second interior portion. The first valve means substantially closes the first inlet to generally prevent fluid flow out of the first inlet and is operable to substantially close the first outlet when fluid flows in the first inlet. The second valve means substantially closes the second inlet to generally prevent fluid flow out of the second inlet and is operable to substantially close the second outlet when fluid flows in the second inlet. The filter screen thereby filters fluid entering the first inlet and exiting the second outlet and is automatically cleaned or backflushed by fluid entering the second inlet and exiting the first outlet.

BRIEF DESCRIPTION OF THE DRAWINGS

The present invention will hereafter be described with reference to the drawing figures, wherein.

DETAILED DESCRIPTION OF THE PREFERRED EMBODIMENTS

Figure 1:
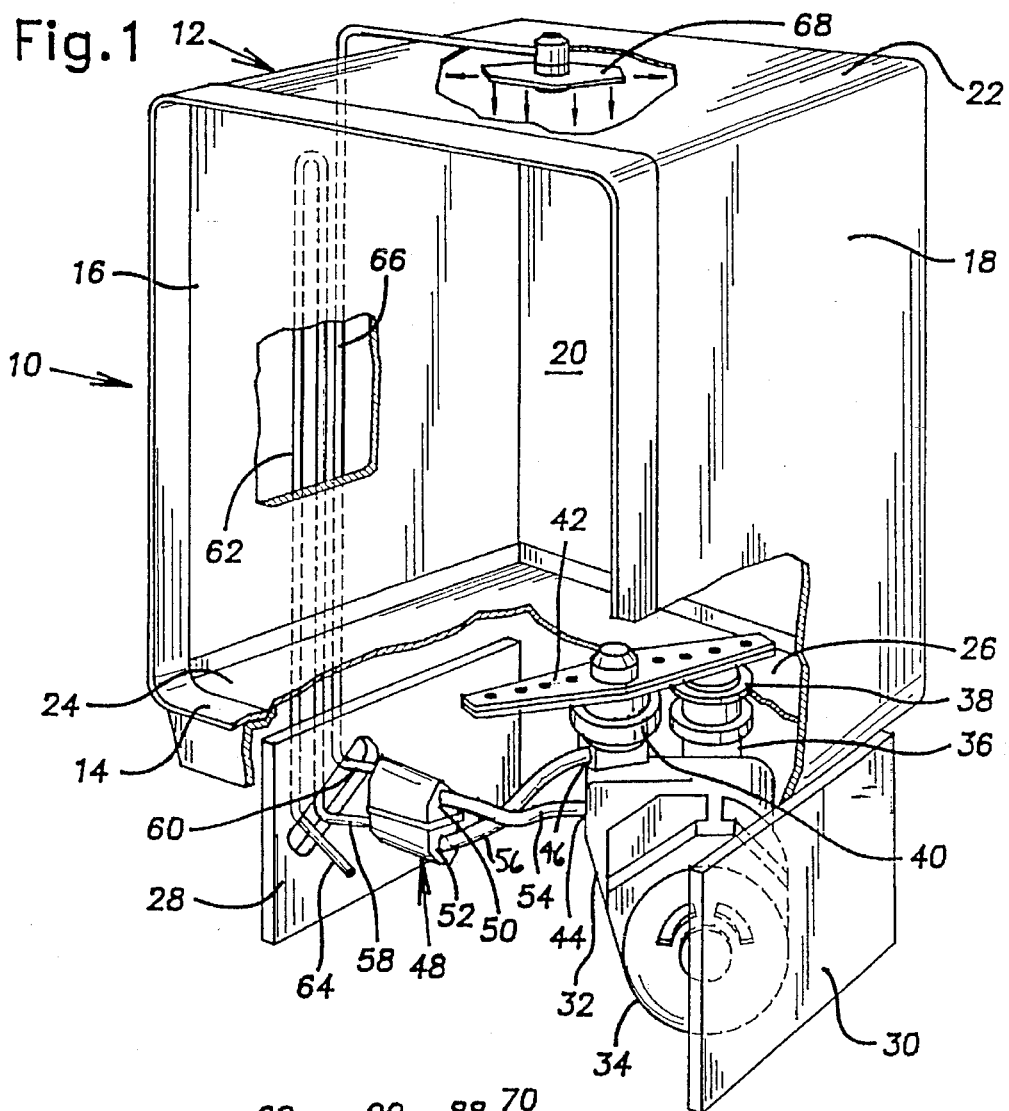
FIG. 1 is a perspective view of a dishwasher, with parts broken away, incorporating a filter screen assembly according to the present invention.

FIG. 1 illustrates portions of a dishwasher 10 relevant to an understanding of the construction and operation of the present invention. The dishwasher 10 has a tub 12 with an open front 14 which is normally closed by a door (not shown) hinged along the lower side and latched at the top. The tub 12 is formed by a pair of spaced apart side walls 16, 18, a back wall 20 which connects the side walls 16, 18, a top wall 22 which closes off an upper side of the tub 12, and a bottom wall 24 which closes off a lower side of the tub 12. The bottom wall 24 is formed into a sump 26, which is generally depressed from a planar surface and sized to accommodate a desired volume of wash water without having the water flow through the open front 14. The dishwasher 10 is supported on a pair of base legs 28, 30 which are connected in a suitable manner to the tub 12 and serve to space the tub 12 above the floor to provide sufficient space for operating mechanisms of the dishwasher 10.

Below the sump 26 is mounted a pump 32 driven by an integrally mounted electric motor 34. The pump 32 is generally of the centrifugal type, and has an inlet 36 16 connected to an inlet fitting 38 located toward the rear of the lowest portion of the sump 26. The pump 32 has a first spray arm port or outlet 40 connected to a main or lower spray arm 42. The lower spray arm 42 has suitable openings for directing a spray of water at the contents of the tub and for causing the lower spray arm 42 to rotate by a reaction force as it sprays. The pump 32 also has a drain port or outlet 44 and, above that, a second spray arm port or outlet 46.

Although the pump 32 is not shown or described in detail, it should be understood that the pump 32 may be constructed in a known manner. The pump 32 typically has a diverter valve (not shown) which can be actuated between a first position during the wash mode and a second position during a drain mode. In the first position, the diverter valve blocks off the drain outlet 44 and directs water flow through the first and second spray arm outlets 40, 46. In the second position, the diverter valve substantially blocks off flow to the first and second spray arm outlets 40, 46 and directs substantially all of the water flow through the drain outlet 44.

A filter screen assembly 48 according to a preferred embodiment of the invention is mounted adjacent one of the base legs 28 and generally facing the pump 32. Located on a side of the filter screen assembly 48 facing the pump 32 is a first or drain inlet 50 on an upper portion and a second or spray arm inlet 52 on a lower portion. A drain hose 54 connects the pump drain outlet 44 to the drain inlet 50 of the filter screen assembly 48. A suitable hose 56 also connects the pump second spray arm outlet 46 with the spray arm inlet 52 of the filter screen assembly 48. Located on an opposite side of the filter screen assembly 42 is a first or spray arm outlet 60 on the upper portion and a second or drain outlet 58 on the lower portion. The drain outlet 58 of the filter screen assembly 48 is connected to a high loop tube 62 to prevent back flow, which in turn, at its other end, has an outlet 64 to be connected to a household sewer drain. A suitable tube 66 connects the spray arm outlet 60 of the filter screen assembly 48 to a second or upper spray arm 68. The upper spray arm 68, like the lower spray arm 42, has suitable openings for directing a spray of water at the contents of the tub and for causing the upper spray arm 68 to rotate by a reaction force as it sprays.

Figure 2:
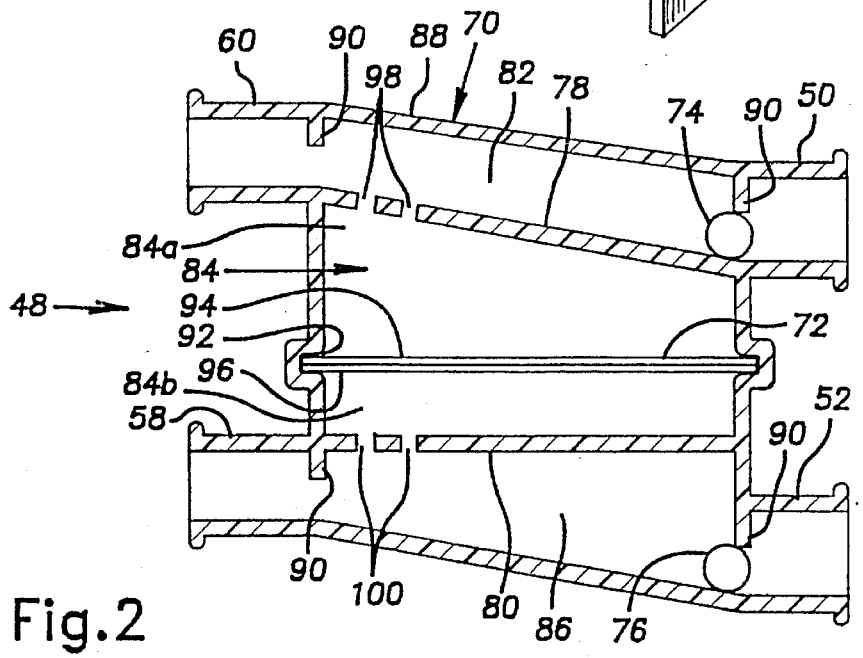
FIG. 2 is an elevational view, in cross-section, of the filter screen assembly of FIG. 1 during idle mode.
Figure 3:
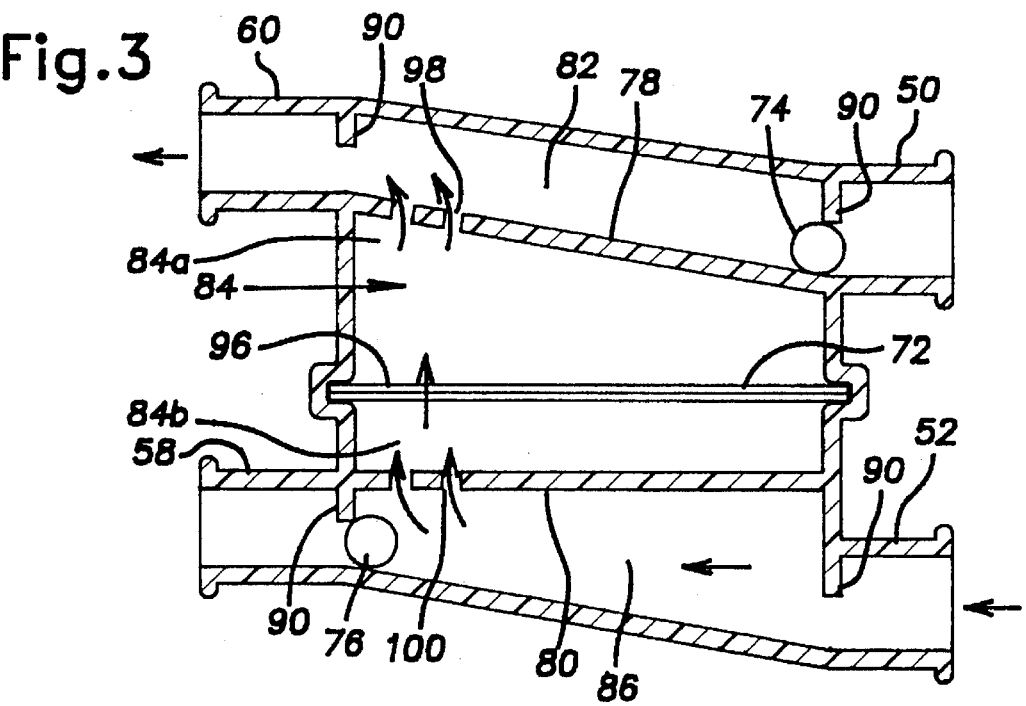
FIG. 3 is an elevational view, in cross-section, of the filter screen assembly of FIG. 1 during wash mode.
Figure 4:
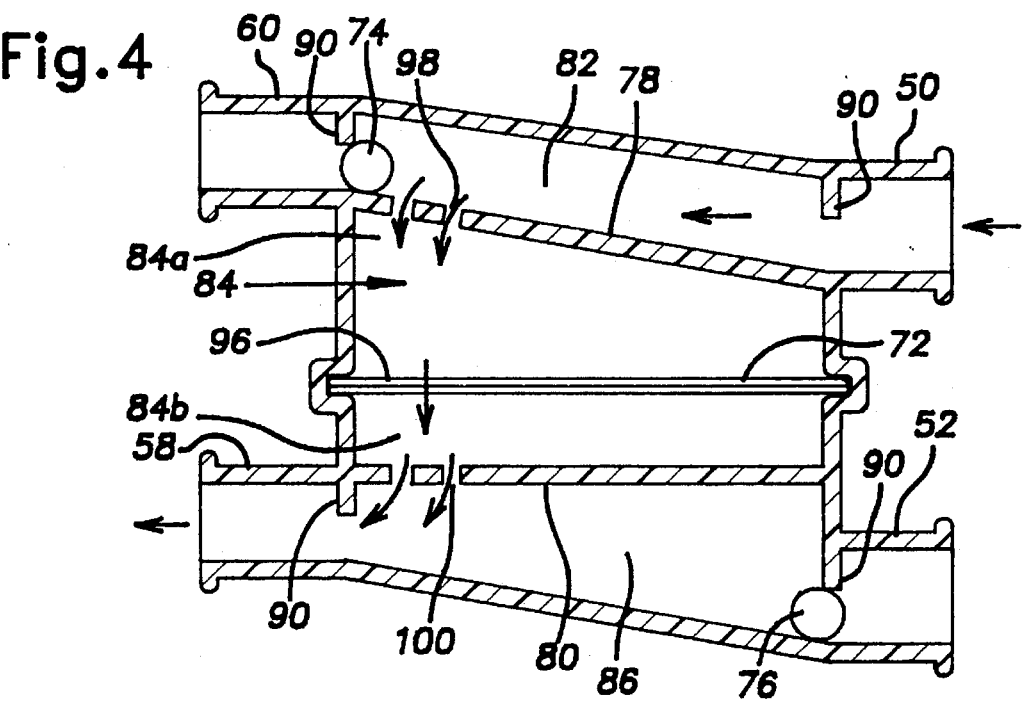
FIG. 4 is an elevational view, in cross-section, of the filter screen assembly of FIG. 1 during drain mode.

Construction and operation of the filter screen assembly 48 can be more easily understood with reference to FIGS. 2–4. The filter screen assembly 48 includes a shell or housing 70, a filter screen 72, and a pair of check balls 74, 76. The housing 70 is preferably formed in two halves from a suitable plastic material such as polypropylene. The two halves of the housing 70 are secured together, with the filter screen 72 and check balls 74, 76 in place, by a suitable means such as heat sealing or ultrasonic welding.

The housing 70 has two interior walls 78, 80 which divide an interior cavity of the housing 70 into three chambers 82, 84, 86. The first or upper interior wall 78, along with exterior walls 88 of the housing 70, form the first or top chamber 82 in an upper portion of the housing 70. The drain inlet 50 and the upper spray arm outlet 60 are located at opposite ends of the top chamber 82 and each open into, that is, are in fluid communication with, the top chamber 82. The second or center chamber 84 is formed by the interior walls 78, 80, along with the exterior walls 88, in a central portion of the housing 70. The second or lower interior wall 80 forms, along with the exterior walls 88, the third or bottom chamber 86 in an upper portion of the housing 70. The spray arm inlet 52 and the drain outlet 58 are located at opposite ends of the bottom chamber 86 and each open into, that is, are in fluid communication with, the bottom chamber 86.

A valve or ball seat 90 is located at each interface between the respective inlets 50, 52, outlets 58, 60, and chambers 82, 86. The ball seats 90 are adapted to generally seal the interface, that is, substantially block fluid communication through the interface, when a respective one of the check balls is seated thereon. The check balls 74, 76 are preferably formed from a suitable plastic such as polypropylene and are sized for engagement with the ball seats 90.

The filter screen assembly 48 also includes means for biasing the check balls 74, 76 to the ball seats 90 associated with the inlets 50, 52. The biasing means of the illustrated embodiment includes inclined or sloping bottom walls of the top and bottom chambers 82, 86 which support the check balls. The check balls 74, 76 are forced by gravity to roll or slide down the inclined walls to the ball seats 90 the respective inlets 50, 52, as shown in FIG. 2. The bottom walls of the top and bottom chambers 82, 86 are formed such that check balls 74, 76 are biased to the ball seats 90 associated with the inlets 50, 52. A flow of water through either of the inlets 50, 52, however, overcomes the bias to force the respective check ball 74, 76 to the ball seat 90 of the associated outlet 58, 60.

Formed generally at the center of the housing 70 is an internal groove 92 adapted for sealingly receiving a frame 94. Molded within the frame 94 is a filter screen 96. The filter screen 96 is preferably of a fine mesh suitable for filtering soil particles from wash water. Mounted in this fashion, the filter screen 96 is generally horizontally disposed and divides the center chamber into upper and lower portions 84a, 84b.

The upper interior wall 78 includes a plurality of openings or apertures 98 such that the upper chamber 82 opens into, that is, is in fluid communication with, the upper portion 84a of the center chamber 84. The openings 98 are preferably located near the upper spray arm outlet 60. The lower interior wall 80 also includes a plurality of openings or apertures 100 such that the lower chamber 86 opens into, that is, is in fluid communication with, the lower portion 84b of the center chamber 84. The openings 100 are preferably located near the drain outlet 58.

Operation of the filter screen assembly 48 is best seen in FIGS. 2–4. When the dishwasher is in an idle mode, the check balls 74, 78 are forced against the ball seats 90 associated with the inlets 50, 52, as shown in FIG. 2. When the dishwasher is in a wash mode, a flow of water from the pump passes through the upper spray arm inlet 52 and enters the bottom chamber 86 as shown in FIG. 3. The flow of water upwardly forces the check ball 76 in the bottom chamber 86 to the ball seat 90 associated with the drain outlet 58. The flow of water is substantially blocked by the check ball 76 from passing to the drain outlet 58 and passes through the openings 100 of the lower interior wall 80 from the bottom chamber 86 to the lower portion 84b of the center chamber 84. In the center chamber 84 the flow of water passes through the filter screen 96 from the lower portion 84b to the upper portion 84a and deposits any carried soil particles on the lower side of the filter screen 96. The flow of water passes through the openings 98 of the upper interior wall 78 from the upper portion 84a of the center chamber 84 to the top chamber 82. The flow of water is substantially blocked by the check ball 74 from passing to the drain inlet 50 and passes through the upper spray arm outlet 60 from the top chamber 82 to the upper spray arm. At the end of the wash mode, the flow of water through the upper spray arm inlet 52 substantially stops and the check ball 76 in the lower chamber 86 is again biased to the ball seat 90 associated with the upper spray arm inlet 52 as shown in FIG. 2.

When the dishwasher is in a drain mode, a flow of water from the pump passes through the drain inlet 50 and enters the top chamber 82 as shown in FIG. 4. The flow of water upwardly forces the check ball 74 in the top chamber 82 to the ball seat 90 associated with the upper spray arm outlet 60. The flow of water is substantially blocked from passing to the upper spray arm outlet 60 and passes through the openings 98 of the upper interior wall 78 from the top chamber 82 to the upper portion 84a of the center chamber 84. In the center chamber 84 the flow of water passes through the filter screen 96 from the upper portion 84a to the lower portion 84b and flushes away any accumulated soil particles on the lower side of the filter screen 96. The flow of water, with the soil particles, passes through the openings 100 of the lower interior wall 80 from the lower portion 84b of the center chamber 84 to the bottom chamber 86. The flow of water is substantially blocked from passing through the upper spray arm inlet 52 and passes through the drain outlet 58 from the bottom chamber 86 to the household sewer drain. At the end of the drain mode, the flow of water through the drain inlet 50 stops and the check ball 74 in the upper chamber 82 is again biased to the ball seat 90 associated with the drain inlet 50 as shown in FIG. 2.

It will therefore be seen that the filter screen assembly 48 functions to filter soil particles from water delivered to the upper spray arm 68 during the wash mode and to automatically back flush any accumulated soil particles from the filter screen 96 during the drain mode to avoid any build-up and/or clogging of the filter screen 96. Although particular embodiments of the invention have been described in detail, such as operation in a dishwasher having a unidirection pump, it will be understood that the invention is not limited correspondingly in scope, but includes all changes and modifications coming within the spirit and terms of the claims appended hereto.

What is claimed is:

1. A filter assembly comprising:

a housing having an interior, first and second interior walls dividing said interior into first, second and third chambers, a first inlet and a first outlet opening into opposite ends of said first chamber, and a second inlet and a second outlet opening into opposite ends of said third chamber, said first interior wall having at least one opening for fluid communication between said first and said second chambers and said second interior wall having at least one opening for fluid communication between said second and said third chambers;

a filter in said second chamber of said housing;

first valve means within said first chamber operable for substantially closing said first inlet to generally prevent fluid flow out of said first inlet when fluid flows in said second inlet and operable by fluid flow in said first inlet for substantially closing said first outlet when fluid flows in said first inlet; and second valve means within said third chamber operable for substantially closing said second inlet to generally prevent fluid flow out of said second inlet when fluid flows in said first inlet and operable by fluid flow in said second inlet for substantially closing said second outlet when fluid flows in said second inlet.

2. The filter assembly as set forth in claim 1, wherein said at least one opening of said first interior wall is generally near said first outlet such that fluid flowing into said first chamber through said first inlet flows substantially through said first chamber before flowing through said opening of said first interior wall into said second chamber.

3. The filter assembly as set forth in claim 1, wherein said at least one opening of said second interior wall is generally near said second outlet such that fluid flowing into said third chamber through said second inlet flows substantially through said third chamber before flowing through said opening of said second interior wall into said second chamber.

4. The filter assembly as set forth in claim 1, wherein said first valve means comprises a first check ball and ball seats associated with said first inlet and said first outlet, and said second valve means comprises a second check ball and ball seats associated with said second inlet and said second outlet.

5. The filter assembly as set forth in claim 4, wherein said first valve means further comprises means for biasing said first check ball to said ball seat associated with said first inlet, and said second valve means further comprises means for biasing said second check ball to said ball seat associated with said second inlet.

6. The filter assembly as set forth in claim 5, wherein said means for biasing said first check ball includes a first support surface downwardly inclined toward said first inlet, and said means for biasing said second check ball includes a second support surface downwardly inclined toward said second inlet.

7. The filter assembly as set forth in claim 1, wherein said filter is horizontally disposed within said second chamber.

8. The filter assembly as set forth in claim 7, wherein said first chamber is above said second chamber and said third chamber is below said second chamber.

9. The filter assembly as set forth in claim 1, wherein said first inlet is in fluid communication with said second outlet and said second inlet is in fluid communication with said first outlet.

10. The filter assembly as set forth in claim 1, wherein said first and second outlets of said housing are on the same end of said housing.

11. A dishwasher comprising:

a tub forming a washing chamber having a top and a bottom;

a sump at said bottom of the washing chamber;

a spray arm in the washing chamber;

at least one pump mounted below said sump and having an inlet connected to said sump, a spray arm outlet, and a drain outlet; and a filter assembly comprising:

a housing having an interior, first and second interior walls dividing said interior into first, second and third chambers, a first inlet and a first outlet opening into opposite ends of said first chamber, and a second inlet and a second outlet opening into opposite ends of said third chamber, said first interior wall having at least one opening for fluid communication between said first and said second chambers and said second interior wall having at least one opening for fluid communication between said second and said third chambers, said first inlet connected to said drain outlet of the pump, said second inlet connected to said spray arm outlet of the pump, said first outlet connected to said spray arm, and said second outlet connected to an external drain;

a filter in said second chamber of said housing;

first valve means within said first chamber operable for substantially closing said first inlet of the housing to generally prevent fluid flow out of said first inlet of the housing when fluid flows in said second inlet and operable by fluid flow in said first inlet for substantially closing said first outlet of the housing when fluid flows in said first inlet of the housing; and second valve means within said third chamber operable for substantially closing said second inlet of the housing to generally prevent fluid flow out of said second inlet of the housing when fluid flows in said first inlet and operable by fluid flow in said second inlet for substantially closing said second outlet of the housing when fluid flows in said second inlet of the housing.

12. The dishwasher as set forth in claim 11, wherein said at least one opening of said first interior wall is generally near said first outlet of the housing such that fluid flowing into said first chamber through said first inlet flows substantially through said first chamber before flowing through said opening of said first interior wall into said second chamber.

13. The dishwasher as set forth in claim 11, wherein said at least one opening of said second interior wall is generally near said second outlet of the housing such that fluid flowing into said third chamber through said second inlet flows substantially through said third chamber before flowing through said opening of said second interior wall into said second chamber.

14. The dishwasher as set forth in claim 11, wherein said first valve means comprises a first check ball and ball seats associated with said first inlet and said first outlet of the housing, and said second valve means comprises a second check ball and ball seats associated with said second inlet and said second outlet of the housing.

15. The dishwasher as set forth in claim 14, wherein said first valve means further comprises means for biasing said first check ball to said ball seat associated with said first inlet of the housing, and said second valve means further comprises means for biasing said second check ball to said ball seat associated with said second inlet of the housing.

16. The dishwasher as set forth in claim 15, wherein said means for biasing said first check ball includes a first support surface downwardly inclined toward said first inlet of the housing, and said means for biasing said second check ball includes a second support surface downwardly inclined toward said second inlet of the housing.

17. The dishwasher as set forth in claim 11, wherein said filter is horizontally disposed within said second chamber.

18. The dishwasher as set forth in claim 17, wherein said first chamber is above said second chamber and said third chamber is below said second chamber.

19. The dishwaher as set forth in claim 11, wherein said first and second outlets of said housing are on the same end of said housing.

20. A filter assembly comprising:

a housing having an interior, first and second interior walls dividing said interior into first, second and third chambers, a first inlet and a first outlet opening into opposite ends of said first chamber, and a second inlet and a second outlet opening into opposite ends of said third chamber, said first interior wall having at least one opening near said first outlet for fluid communication between said first and said second chambers and said second interior wall having at least one opening near said second outlet for fluid communication between said second chamber and said third chamber, said first chamber being above said second chamber and said third chamber being below said second chamber;

a filter horizontally disposed in said second chamber of said housing;

a first ball within said first chamber operable for substantially closing said first inlet to generally prevent fluid flow out of said first inlet when fluid flows in said second inlet and operable by fluid flow in said first inlet for substantially closing said first outlet when fluid flows in said first inlet, wherein said first interior wall is downwardly inclined from said first outlet to said first inlet to bias said first ball to said first inlet; and a second ball within said third chamber operable for substantially closing said second inlet to generally prevent fluid flow out of said second inlet when fluid flows in said first inlet and operable by fluid flow in said second inlet for substantially closing said second outlet when fluid flows in said second inlet, wherein a bottom wall of said housing is downwardly inclined from said second outlet to said second inlet to bias said second ball to said second inlet.

* * * * *